United States Patent
Ohori et al.

(10) Patent No.: US 12,191,714 B2
(45) Date of Patent: Jan. 7, 2025

(54) ROTOR, MOTOR AND BRUSHLESS MOTOR

(71) Applicant: MITSUBA Corporation, Gunma (JP)

(72) Inventors: Ryo Ohori, Gunma (JP); Naoki Shioda, Gunma (JP)

(73) Assignee: MITSUBA Corporation, Gunma (JP)

( * ) Notice: Subject to any disclaimer, the term of this patent is extended or adjusted under 35 U.S.C. 154(b) by 331 days.

(21) Appl. No.: 17/283,951

(22) PCT Filed: Aug. 22, 2019

(86) PCT No.: PCT/JP2019/032796
§ 371 (c)(1),
(2) Date: Apr. 8, 2021

(87) PCT Pub. No.: WO2020/100368
PCT Pub. Date: May 22, 2020

(65) Prior Publication Data
US 2021/0384783 A1    Dec. 9, 2021

(30) Foreign Application Priority Data
Nov. 15, 2018    (JP) .................................. 2018-215030

(51) Int. Cl.
*H02K 1/27*    (2022.01)
*H02K 1/2781*    (2022.01)
(Continued)

(52) U.S. Cl.
CPC ......... *H02K 1/2781* (2022.01); *H02K 1/2791* (2022.01); *H02K 1/28* (2013.01); *H02K 3/48* (2013.01)

(58) Field of Classification Search
CPC ...... H02K 1/2781; H02K 1/2791; H02K 1/28; H02K 3/48; H02K 7/1166; H02K 29/03; H02K 2213/03
(Continued)

(56) References Cited

U.S. PATENT DOCUMENTS

| 4,954,736 A | * | 9/1990 | Kawamoto | ............ | H02K 1/278 310/43 |
| 5,397,951 A | * | 3/1995 | Uchida | ................. | H02K 1/278 310/91 |

(Continued)

FOREIGN PATENT DOCUMENTS

| CN | 105432005 | 3/2016 |
| CN | 106104972 | 11/2016 |

(Continued)

OTHER PUBLICATIONS

WO 2018043026 A1 (Year: 2018).*
(Continued)

*Primary Examiner* — Alex W Mok
(74) *Attorney, Agent, or Firm* — JCIPRNET (57) ABSTRACT

A rotor, motor and brushless motor are provided. This rotor (9) includes a rotor core (32), permanent magnets (33), and a protrusion (35) protruding radially outward between permanent magnets (33). The permanent magnets (33) has a parallel orientation in which the easy magnetization direction is parallel to the radial direction in the center of the permanent magnets (33). The circumferential side faces (33d) of the permanent magnets (33) contact the protrusion (35) in the circumferential direction. Connection surfaces (33e) of the permanent magnets (33) are connected to the circumferential side face (33d) and to the outer peripheral surface (33a) on the radial outer side. The front end (35t) of the protrusion (35) in the protrusion direction is arranged between the center (33g) of the circumferential side face (33d) in the protrusion direction and the crossing ridge portion (33h) where the circumferential side face (33d) and the connection surface (33e) cross.

8 Claims, 7 Drawing Sheets

(51) Int. Cl.
*H02K 1/2791* (2022.01)
*H02K 1/28* (2006.01)
*H02K 3/48* (2006.01)

(58) Field of Classification Search
USPC .......................................................... 310/264
See application file for complete search history.

(56) References Cited

U.S. PATENT DOCUMENTS

| 9,985,486 | B2* | 5/2018 | Asao | B32B 37/1284 |
| 2008/0218007 | A1* | 9/2008 | Masuzawa | H01F 1/22 310/44 |
| 2018/0054149 | A1* | 2/2018 | Senoo | H02P 25/20 |
| 2018/0198333 | A1* | 7/2018 | Ohori | H02K 1/278 |

FOREIGN PATENT DOCUMENTS

| JP | 2010187427 | 8/2010 |
| WO | 2010092774 | 8/2010 |
| WO | 2015102047 | 7/2015 |
| WO | 2017002873 | 1/2017 |
| WO | 2018043026 | 3/2018 |

OTHER PUBLICATIONS

JP-2018026928-A (Year: 2018).*
Translation of foreign Patent Document JP 2010187427 (Year: 2010).*
"Search Report of Europe Counterpart Application", issued on Jul. 21, 2022, p. 1-p. 11.
"International Search Report (Form PCT/ISA/210) of PCT/JP2019/032796", mailed on Nov. 5, 2019, with English translation thereof, pp. 1-2.
"Written Opinion of the International Searching Authority (Form PCT/ISA/237) of PCT/JP2019/032796," mailed on Nov. 5, 2019, with English translation thereof, pp. 1-15.
"Office Action of Japan Counterpart Application" with English translation thereof, issued on May 17, 2022, p. 1-p. 11.
"Office Action of Europe Counterpart Application", issued on Jan. 26, 2024, p. 1-p. 8.
"Office Action of China Counterpart Application", issued on May 30, 2024, with English translation thereof, pp. 1-14.

* cited by examiner

ROTOR, MOTOR AND BRUSHLESS MOTOR

CROSS-REFERENCE TO RELATED APPLICATION

This application is a 371 application of the International PCT application serial no. PCT/JP2019/032796, filed on Aug. 22, 2019, which claims the priority benefits of Japan Patent Application No. 2018-215030, filed on Nov. 15, 2018. The entirety of each of the above-mentioned patent applications is hereby incorporated by reference herein and made a part of this specification.

BACKGROUND

Technical Field

The present invention relates to a rotor, a motor and a brushless motor.

Related Art

Conventionally, as a surface magnet (SPM: Surface Permanent Magnet) type rotor having field permanent magnets on the surface of a rotor core, an inset type rotor (for example, see Patent literature 1) is known which is provided with a protrusion protruding outward in the radial direction of the rotor core between permanent magnets arranged in the circumferential direction. In this rotor, the protrusion of the rotor core regulates rotational movement of the permanent magnets on the surface of the rotor core.

LITERATURE OF RELATED ART

Patent Literature

Patent literature 1: International Publication No. WO2015/102047

SUMMARY

Problems to be Solved

Meanwhile, in the rotor as described above, fixing stability of the permanent magnets tends to be improved with an increase in the protrusion length of the protrusion in the radial direction. However, magnetic field distortion tends to be larger with an increase in the protrusion length of a protrusion made of a magnetic material in the radial direction. Therefore, the magnetic field distortion may cause an increase in cogging torque and torque ripple, and an increase in noise and vibration of a motor.

Therefore, an object of the present invention is to provide a rotor, a motor and a brushless motor which can suppress increased magnetic field distortion while maintaining fixing stability of magnets on the surface of a rotor.

Means to Solve Problems

The present invention adopts the following approach to solve the above problems. That is, a rotor of the present invention includes: a shaft rotating around a rotary axis, a rotor core that holds the shaft and rotates with the rotary axis as a radial center, a plurality of magnets arranged on an outer peripheral surface of the rotor core, and a protrusion protruding radially outward between the magnets which are adjacent in a circumferential direction on the outer peripheral surface of the rotor core. An orientation of the magnets is a parallel orientation in which an easy magnetization direction is parallel to a radial direction of a center of the magnets. The magnets include a circumferential side face that contacts the protrusion in the circumferential direction, and a connection surface that is connected to the circumferential side face and to an outer peripheral surface on a radial outer side, and are formed so as to gradually approach the center of the magnets in the circumferential direction as directed outward in the protrusion direction of the protrusion. The position of a front end of the protrusion in the protrusion direction is arranged within an area between a center of the circumferential side face in the protrusion direction and a crossing ridge portion where the circumferential side face and the connection surface cross.

According to the above configuration, the protrusion can support more than half of the region on the circumferential side face of the magnet in the protrusion direction. Accordingly, desired fixing stability (for example, seating property or the like) of the magnet on the outer peripheral surface of the rotor core can be ensured.

In addition, the protrusion is formed so as not to protrude closer to the outside than the crossing ridge portion where the circumferential side face and the connection surface of the magnet cross in the protrusion direction. Accordingly, a magnetic flux leaking from the magnet to the protrusion and distortion of an induced voltage waveform can be suppressed as much as possible below a predetermined allowable level, and an effective magnetic flux of the permanent magnets can be maintained within a predetermined range including a maximum value.

Besides, the orientation of the magnets is a parallel orientation, and the easy magnetization direction in the vicinity of the circumferential end portion of the magnet adjacent to the protrusion intersects with the protrusion direction of the protrusion. Accordingly, formation of a magnetic path by the magnetic flux leaking from the magnet to the protrusion is suppressed, and an increase in the leakage flux can be suppressed.

In addition, in the rotor of the present invention, it is preferable that the connection surfaces is parallel to the easy magnetization direction of the magnets. According to the above configuration, the connection surfaces are parallel to the easy magnetization direction of the magnets which is a parallel orientation. Accordingly, the distortion of the induced voltage waveform can be suppressed.

Besides, in the rotor of the present invention, it is preferable that a radial thickness of the magnets is formed to be larger than a radial thickness of the rotor core.

According to the above configuration, the desired fixing stability of the magnets can be ensured by the protrusion even when the radial thickness of the magnet is formed to be relatively larger than the radial thickness of the rotor core.

A motor of the present invention includes: a stator having an annular stator core and a plurality of teeth protruding radially inward from an inner peripheral surface of the stator core, a plurality of coils attached to the teeth, and the rotor arranged on a radial inner side with respect to the plurality of teeth.

According to the above configuration, the motor includes a rotor that ensures a desired effective magnetic flux of the magnets and suppresses the magnetic flux leaking from the magnet to the protrusion and the distortion of the induced voltage waveform. Accordingly, it is possible to ensure a desired output while suppressing the increase in cogging torque and torque ripple due to the magnetic field distortion and the increase in vibration and noise when the motor is driven.

A brushless motor of the present invention includes the motor.

According to the above configuration, the desired output of the brushless motor can be ensured, and the increase in vibration and noise during driving can be suppressed.

Effect

According to the present invention, the fixing stability of the magnets in the rotor can be ensured, and the increased magnetic field distortion can be suppressed.

DESCRIPTION OF THE EMBODIMENTS

Hereinafter, a rotor, a motor, and a brushless motor according to an embodiment of the present invention are described with reference to the accompanying drawings.

(Brushless Motor)

Figure 1:
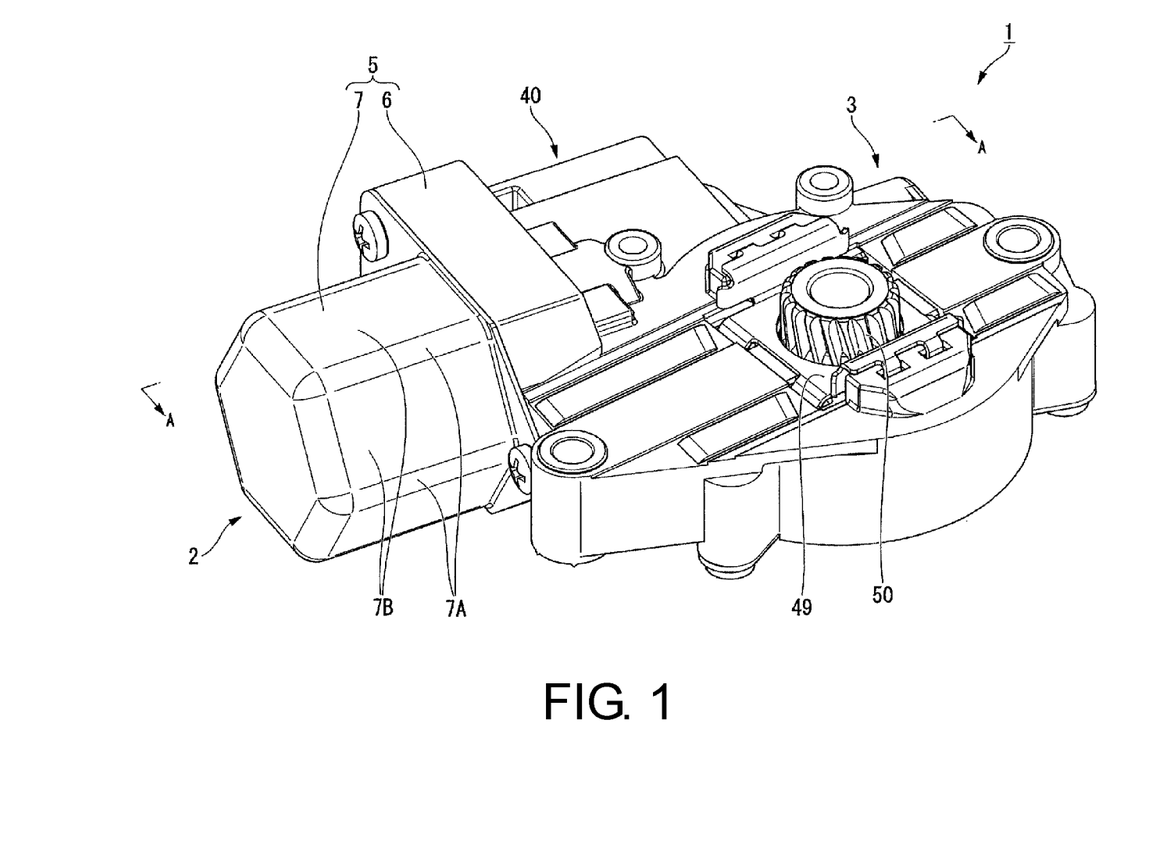
FIG. 1 is a perspective view of a brushless motor according to an embodiment of the present invention.
Figure 2:
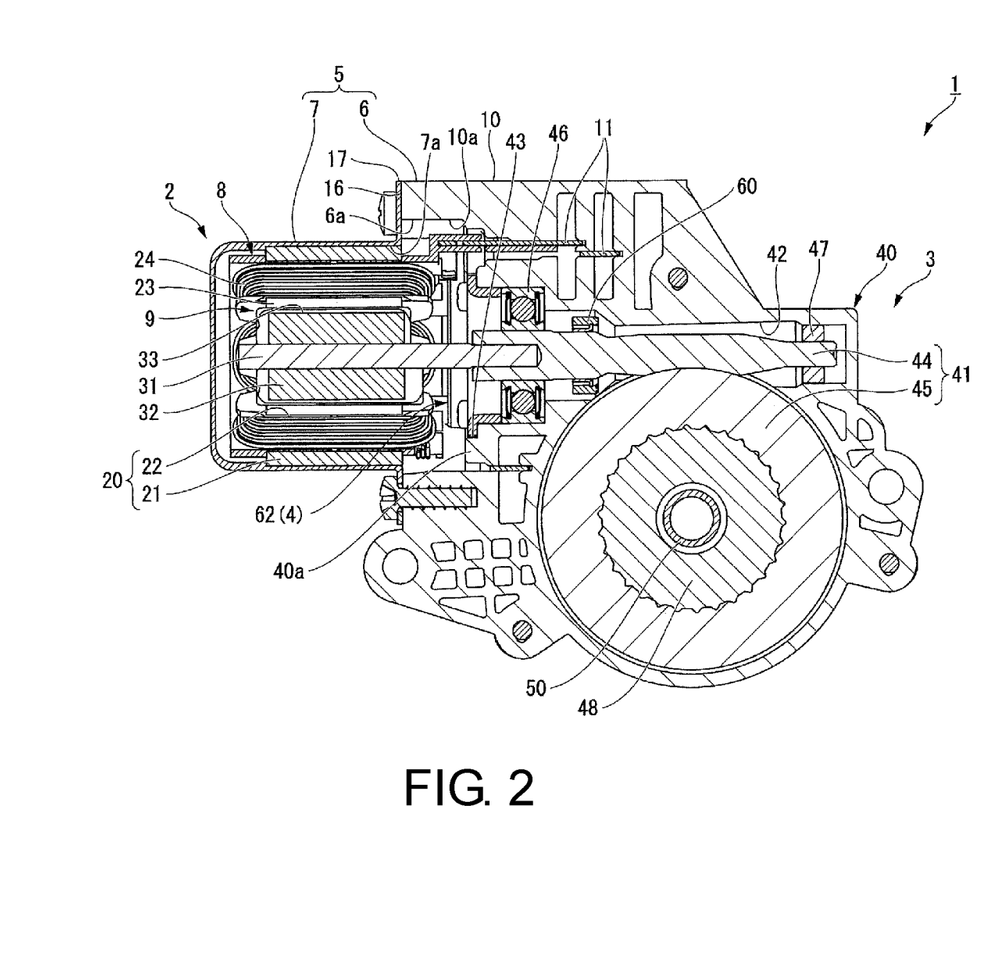
FIG. 2 is a cross-sectional view of the brushless motor according to an embodiment of the present invention along line A-A of FIG. 1.

FIG. 1 is a perspective view of a brushless motor 1. FIG. 2 is a cross-sectional view taken along line A-A of FIG. 1.

As shown in FIG. 1 and FIG. 2, the brushless motor 1 is, for example, a drive source for a sunroof mounted on a vehicle. The brushless motor 1 includes a motor unit (motor) 2, a deceleration unit 3 for decelerating and outputting the rotation of the motor unit 2, and a controller unit 4 for controlling the drive of the motor unit 2. Moreover, the motor unit 2 in the embodiment is an example of a motor within the scope of claims. Moreover, in the following description, the term "axial direction" refers to the rotary axis direction of a shaft 31 of the motor unit 2, the term "circumferential direction" refers to the circumferential direction of the shaft 31, and the term "radial direction" refers to the radial direction of the shaft 31.

(Motor Unit)

The motor unit 2 includes a motor case 5, a substantially square tubular stator 8 housed in the motor case 5, and a rotor 9 arranged on the radial inner side of the stator 8 and rotatable with respect to the stator 8. The motor unit 2 is a so-called brushless motor that does not require a brush to supply electric power to the stator 8.

(Motor Case)

The motor case 5 is made of, for example, a material such as aluminum die casting having excellent heat dissipation. The motor case 5 includes a first motor case 6 and a second motor case 7 that can be divided in the axial direction. The outer shapes of the first motor case 6 and the second motor case 7 are each formed in a bottomed tubular shape. The outer shape of the first motor case 6 is formed in, for example, a bottomed square tubular shape. The outer shape of the second motor case 7 is formed in, for example, a bottomed tubular shape having a substantially rounded regular hexagonal cross section. The outer peripheral surface of the second motor case 7 has six corner portions 7A and six flat portions 7B.

The first motor case 6 is integrally formed with a gear case 40 so that an end portion 10 is joined to the gear case 40 of the deceleration unit 3. A through hole 10a through which the shaft 31 of the rotor 9 can be inserted is formed at substantially the center of the end portion 10 in the radial direction.

In addition, an edge portion 16 for joining the second motor case 7 is formed at an opening portion 6a of the first motor case 6, and an outer flange portion 17 protruding radially outward is formed at an opening portion 7a of the second motor case 7. The edge portion 16 and the outer flange portion 17 are butted against each other to form the motor case 5 having an internal space. Besides, the stator 8 is arranged in the internal space of the motor case 5 so that a part of coils 24 described later is accommodated inside the first motor case 6, and a stator core 20 described later is fitted inside the second motor case 7.

(Stator)

Figure 3:
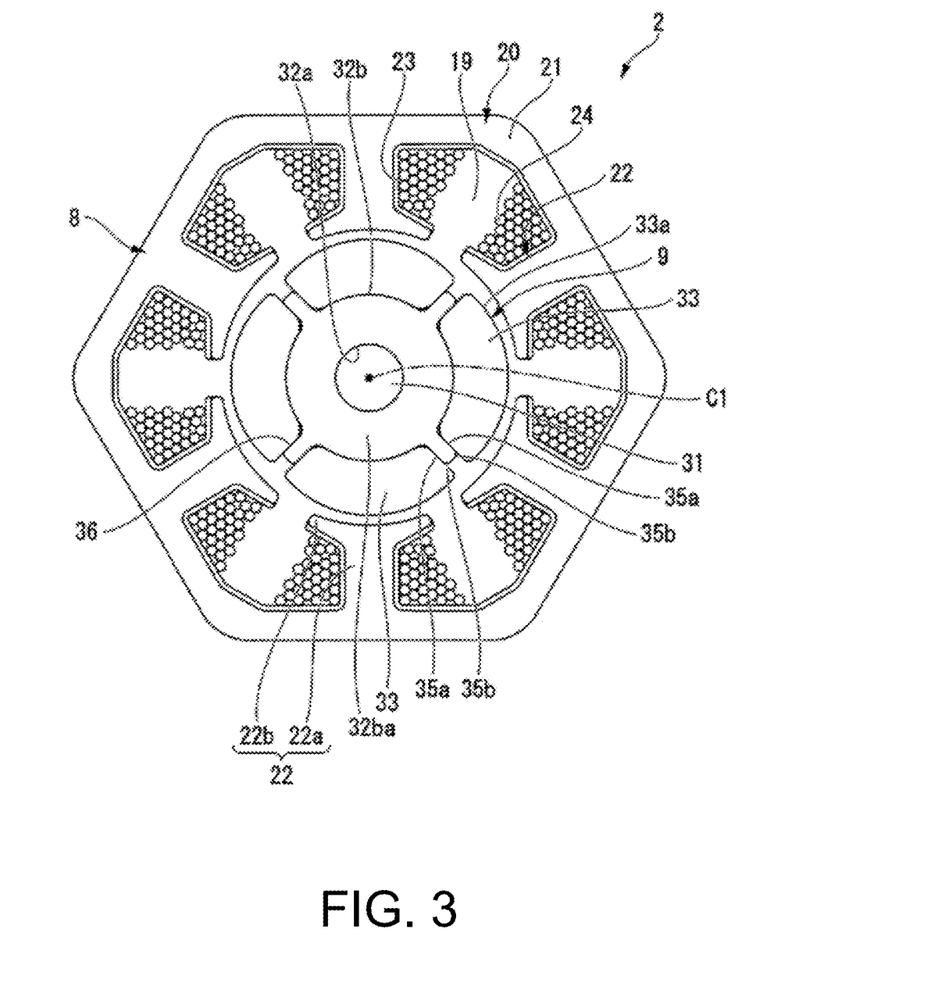
FIG. 3 is a plan view of a stator and a rotor according to an embodiment of the present invention as viewed from the axial direction.

FIG. 3 is a plan view of the stator 8 and the rotor 9 as viewed from the axial direction. As shown in FIG. 2 and FIG. 3, the stator 8 includes the stator core 20 in which a tubular core portion 21 is integrally formed with a plurality of (for example, in the present embodiment, six) teeth 22 protruding radially inward from the core portion 21. The stator core 20 is formed by laminating a plurality of metal plates in the axial direction. Moreover, the stator core 20 can be formed not only by laminating a plurality of metal plates in the axial direction, but also by, for example, pressure molding soft magnetic powder.

The core portion 21 is formed in a square tubular shape having a substantially rounded regular hexagonal cross section so as to be fitted inside the second motor case 7. Accordingly, the outer peripheral surface of the core portion 21 has six corner portions and six flat portions. The plurality of teeth 22 are arranged so as to protrude radially inward from the portions corresponding to each side of the regular hexagon in the cross section of the core portion 21.

The teeth 22 include an integrally formed teeth body 22a and a pair of flange portions 22b. The teeth body 22a protrudes inward along the radial direction from an inner peripheral surface of the core portion 21. The flange portion 22b extends along the circumferential direction from the radial inner end of the teeth body 22a. The pair of flange portions 22b are formed so as to extend outward in the circumferential direction from the teeth body 22a. Besides, a slot 19 is formed between the flange portions 22b which are adjacent in the circumferential direction.

In addition, the inner peripheral surface of the core portion 21 and the teeth 22 are covered with a resin insulator 23. The coil 24 is attached so as to be wound around each tooth 22 from the surface of the insulator 23. Each coil 24 generates a magnetic field for rotating the rotor 9 by power fed from the controller unit 4.

(Rotor)

The rotor 9 is rotatably arranged on the radial inner side of the stator 8 through a minute gap. The rotor 9 includes the shaft 31, a rotor core 32, and four permanent magnets 33. Thus, in the motor unit 2, for example, the ratio of the number of magnetic poles of the permanent magnets 33 to the number of the slots 19 (the teeth 22) is 4:6.

The rotor 9 rotates with a rotary axis which is a center line (shaft center) C1 of the shaft 31 as the radial center.

The shaft 31 is integrally formed with a worm shaft 44 (see FIG. 2) that constitutes the deceleration unit 3. The shaft 31 rotates around the rotary axis.

The rotor core 32, which comprises a rotor core base 32ba and protrusions 35, is fixed so as to be fitted to the outside of the shaft 31. The outer shape of the rotor core 32 is formed in a columnar shape with the shaft 31 as a shaft center C1.

The rotor core 32 is formed by laminating a plurality of metal plates in the axial direction. Moreover, the rotor core 32 can be formed not only by laminating a plurality of metal plates in the axial direction, but also by, for example, pressure molding soft magnetic powder.

Besides, a through hole 32a penetrating in the axial direction is formed at substantially the center of the rotor core 32 in the radial direction. The shaft 31 is pressed into the through hole 32a. Moreover, the shaft 31 may be relatively inserted into the through hole 32a so that the rotor core 32 is fitted to the outside of the shaft 31, and the shaft 31 and the rotor core 32 may be fixed by an adhesive or the like.

In the rotor core 32, the positions of the arc center of an inner peripheral surface on the radial inner side (that is, an inner peripheral surface of the through hole 32a) and the arc center of an outer peripheral surface 32b on the radial outer side coincide with the position of the shaft center C1 of the shaft 31.

Furthermore, four protrusions 35 are arranged on the outer peripheral surface 32b of the rotor core base 32ba at equal intervals in the circumferential direction. The protrusions 35 are formed so as to protrude outward in the radial direction and extend over the entire rotor core 32 in the axial direction.

In addition, the protrusions 35 are formed in such a manner that two side faces 35a facing each other in the circumferential direction are parallel to the protrusion direction. That is, the protrusions 35 are formed in such a manner that the width dimensions in the circumferential direction are uniform in the protrusion direction.

Furthermore, round chamfered portions 35b are formed at the corner portions of the protrusions 35 on both sides in the circumferential direction which is outside in the protrusion direction.

On the outer peripheral surface 32b of the rotor core 32 formed in this way, the spaces between two protrusions 35 which are adjacent in the circumferential direction are each configured as a magnet housing portion 36.

On the outer peripheral surface 32b of the rotor core 32 formed in this way, the spaces between two protrusions 35 which are adjacent in the circumferential direction are each configured as a magnet housing portion 36.

That is, the rotor 9 is a surface magnet (SPM: Surface Permanent Magnet) type rotor having field permanent magnets 33 on the outer peripheral surface 32b of the rotor core 32, as well as an inset type rotor provided with the protrusion 35 protruding outward in the radial direction of the rotor core 32 between the permanent magnets 33 arranged in the circumferential direction.

The four permanent magnets 33 are arranged in the four magnet housing portions 36 arranged on the outer peripheral surface 32b of the rotor core 32. In the magnet housing portion 36, each permanent magnet 33 is fixed to the rotor core 32 by, for example, an adhesive or the like.

The permanent magnet 33 is, for example, a ferrite magnet, a neodymium bond magnet, a neodymium sintered magnet, or the like.

The permanent magnets 33 are magnetized so that the orientation of the magnetism (magnetic field) is a parallel orientation along the thickness direction. That is, the orientation of the permanent magnets 33 is a parallel orientation in which the easy magnetization direction is a direction parallel to the radial direction in the center of the permanent magnets 33.

Besides, the permanent magnets 33 which are adjacent in the circumferential direction are arranged in such a manner that the magnetization directions are opposite to each other. The four permanent magnets 33 are arranged in such a manner that the magnetic poles are different from each other in the circumferential direction. That is, the permanent magnet 33 having the N pole on the outer peripheral side and the permanent magnet 33 having the S pole on the outer peripheral side are arranged adjacent to each other in the circumferential direction. Accordingly, the protrusion 35 of the rotor core 32 which is arranged between the permanent magnets 33 adjacent to each other in the circumferential direction is located at the boundary (pole boundary) of the magnetic poles.

Figure 4:
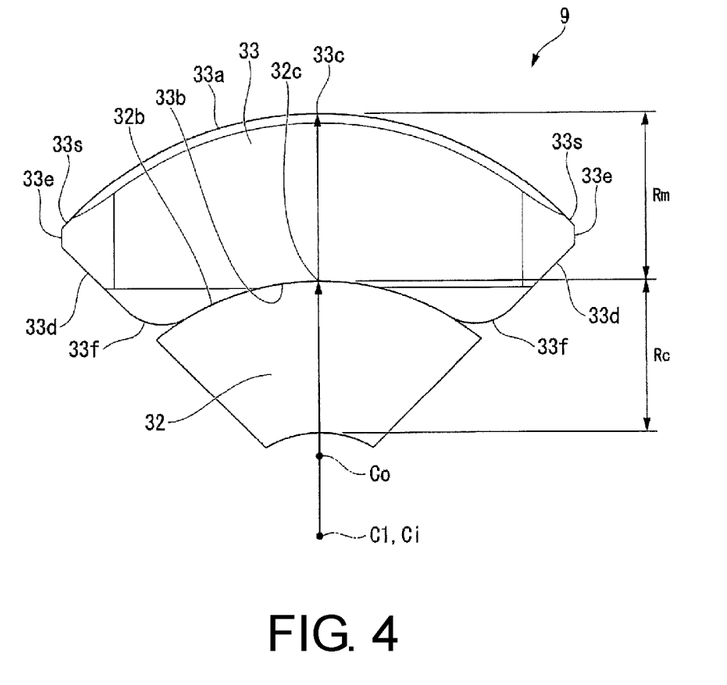
FIG. 4 is a plan view in which a part of the rotor according to an embodiment of the present invention is shown in an enlarged manner, and is a diagram showing the dimensions of a rotor core and permanent magnets.

FIG. 4 is a plan view in which a part of the rotor 9 is shown in an enlarged manner, and is a diagram showing the dimensions of the rotor core 32 and the permanent magnets 33.

In the permanent magnets 33, the position of an arc center Ci of an inner peripheral surface 33b on the radial inner side coincides with the position of the shaft center C1 of the shaft 31.

In the permanent magnets 33, an arc center Co of an outer peripheral surface 33a on the radial outer side is eccentric with respect to the shaft center C1 of the shaft 31. Specifically, the arc center Co of the outer peripheral surface 33a of the permanent magnet 33 is set closer to the outer peripheral surface 32b of the rotor core 32 than the shaft center C1 in the radial direction passing through the center of the permanent magnet 33. Accordingly, the permanent magnet 33 is formed in such a manner that the radial thickness at end portions 33s of the shaft 31 on both sides in the circumferential direction around the shaft center C1 is smaller than the radial thickness in a center 33c of the circumferential direction. As a result, a gap between the outer peripheral surface 33a of the permanent magnet 33 on the radial outer side and the inner peripheral surface of the teeth 22 is the smallest in the center 33c of the permanent magnet 33 in the circumferential direction, and tends to be larger as separated in the circumferential direction from the center 33c of the circumferential direction.

The radial thickness of the permanent magnet 33 is formed to be larger than the radial thickness of the rotor core 32. For example, a radial thickness Rm in the center 33c of the permanent magnet 33 in the circumferential direction is formed to be larger than a radial thickness Re in a center 32c of the rotor core 32 in the circumferential direction.

Almost the entire inner peripheral surface 33b of the permanent magnet 33 is in contact with the outer peripheral surface 32b of the rotor core 32. In addition, each surface of the permanent magnet 33 on both sides in the circumferential direction includes a circumferential side face 33d in contact with the protrusion 35, and a connection surface 33e connected to the circumferential side face 33d and to the outer peripheral surface 33a on the radial outer side.

The circumferential side face 33d is smoothly connected to the inner peripheral surface 33b on the radial inner side via an arc surface 33f. The circumferential side face 33d is formed on, for example, a flat surface.

The connection surface 33e is arranged closer to the radial outer side than the circumferential side face 33d, and is connected to the circumferential side face 33d and to the outer peripheral surface 33a.

The connection surface 33e is formed on, for example, a flat surface. The connection surface 33e is formed so as to gradually approach the center 33e of the permanent magnets 33 in the circumferential direction as the connection surface 33e is directed outward in the protrusion direction of the protrusion 35. For example, the connection surface 33e is formed so as to gradually increase the radial thickness of the permanent magnet 33 as the connection surface 33e is directed outward in the radial direction. That is, the pair of connection surfaces 33e on both sides of the permanent magnet 33 in the circumferential direction are formed so as to gradually decrease the interval in the circumferential direction as the connection surfaces 33e are directed outward in the radial direction.

Besides, the connection surfaces 33e are arranged parallel to the easy magnetization direction of the permanent magnets 33.

Figure 5:
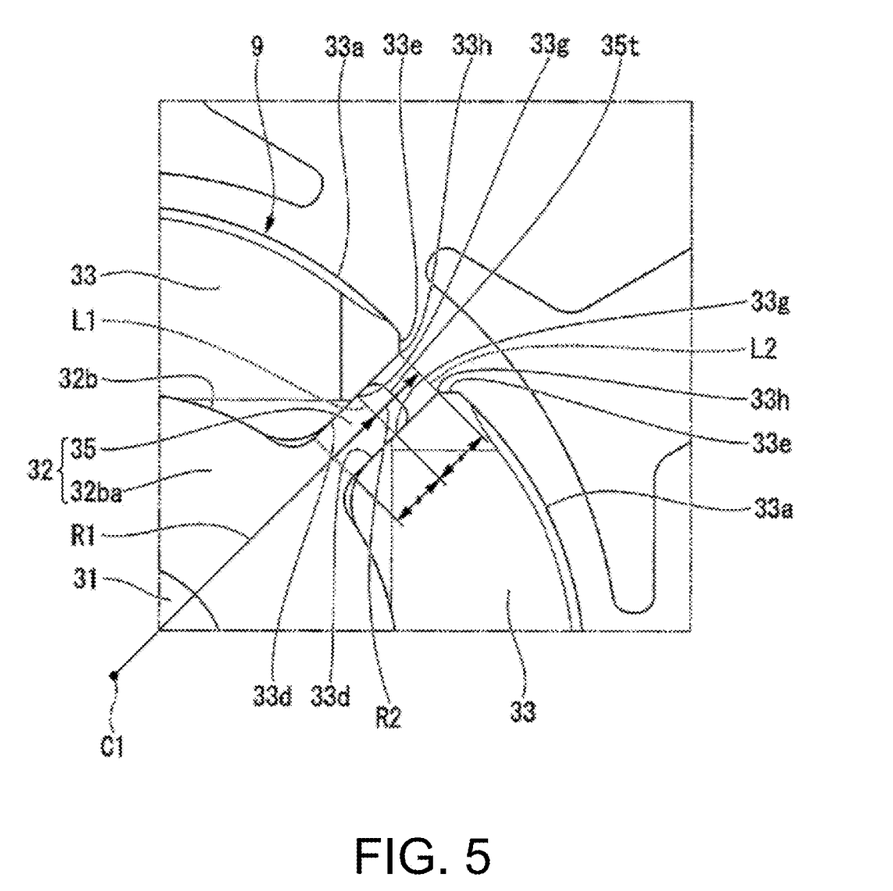
FIG. 5 is a plan view in which a part of the rotor according to an embodiment of the present invention is shown in an enlarged manner, and is a diagram showing a length range of a protrusion in the protrusion direction.

FIG. 5 is a plan view in which a part of the rotor 9 is shown in an enlarged manner, and is a diagram showing a length range of the protrusion 35 in the protrusion direction.

The position of a front end 35t of the protrusion 35 in the protrusion direction is arranged within the area between a center 33g of the circumferential side face 33d of the permanent magnet 33 in the protrusion direction and a crossing ridge portion 33h where the circumferential side face 33d and the connection surface 33e cross. That is, the position of the front end 35t is arranged between a straight line L1 connecting the centers 33g of the adjacent peripheral side faces 33d and a straight line L2 connecting the adjacent crossing ridge portions 33h in the two permanent magnets 33 adjacent to each other so as to sandwich the protrusion 35 from both sides in the circumferential direction.

For example, a radius R (outer diameter/2) of a circle centered on the shaft center C1 of the shaft 31 and tangent to the front end 35t of the protrusion 35 is equal to or greater than a radius (first radius) R1 of a circle centered on the shaft center C1 and tangent to a straight line L1, and is equal to or smaller than a radius (second radius) R2 of a circle centered on the shaft center C1 and tangent to a straight line L2.

Figure 6:
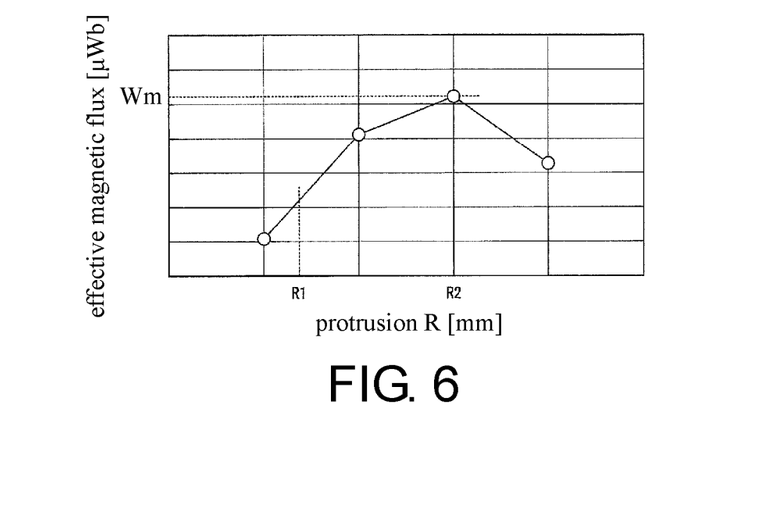
FIG. 6 is a graph showing an example of the relationship between the length of the protrusion of the rotor according to an embodiment of the present invention and an effective magnetic flux of the permanent magnets.
Figure 7:
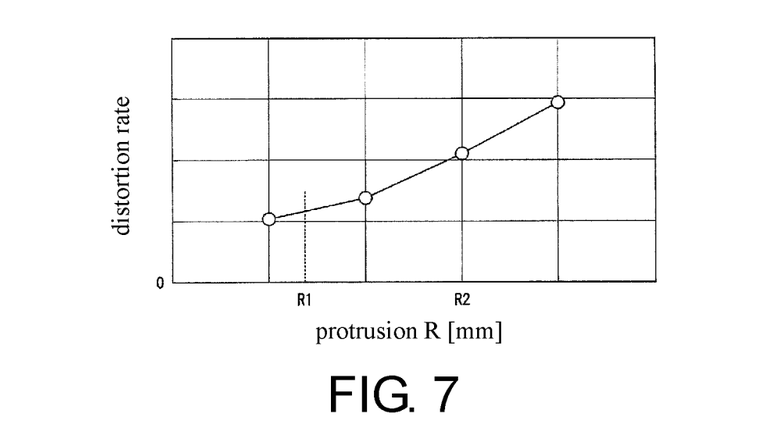
FIG. 7 is a graph showing an example of the relationship between the length of the protrusion of the rotor according to an embodiment of the present invention and a distortion rate of an induced voltage.

FIG. 6 is a graph showing an example of the relationship between the length of the protrusion 35 of the rotor 9 and an effective magnetic flux of the permanent magnets 33. FIG. 7 is a graph showing an example of the relationship between the length of the protrusion 35 of the rotor 9 and a distortion rate of an induced voltage waveform. Moreover, in FIG. 6 and FIG. 7, the length of the protrusion 35 is, for example, the radius R (outer diameter/2) of the circle tangent to the front end 35t of the protrusion 35.

In the rotor 9, the fixing stability of the permanent magnets 33 in contact with the protrusion 35 (for example, the seating property for the magnet housing portion 36 or the like) tends to be improved with an increase in the length of the protrusion 35 in the protrusion direction. On the other hand, the magnetic flux leaking from the permanent magnet 33 to the protrusion 35 and the distortion of the induced voltage waveform tend to be larger with the increase in the length of the protrusion 35 in the protrusion direction. Moreover, the induced voltage is a voltage induced in each coil 24 by the external drive of the rotor 9 when the power supply for each coil 24 of the stator 8 is de-energized. The distortion of the induced voltage waveform is caused by, for example, superimposing harmonics in a sinusoidal induced voltage waveform, and causes an increase in vibration and noise when the brushless motor 1 is driven. The distortion rate shown in FIG. 7 is zero when the induced voltage waveform is sinusoidal.

As shown in FIG. 6 and FIG. 7, the distortion of the induced voltage waveform tends to be larger as the radius R corresponding to the front end 35t of the protrusion 35 increases from the first radius R1, and in contrast, the effective magnetic flux for the teeth 22 of the permanent magnets 33 is maximized at the second radius R2.

That is, the lower limit of the range that defines the length of the protrusion 35 in the protrusion direction is set to, for example, ensure desired fixing stability by the protrusion 35 supporting at least half or more of the portion of the circumferential side face 33d of the permanent magnet 33 in the protrusion direction. In addition, the upper limit of the range that defines the length of the protrusion 35 in the protrusion direction is set to, for example, maintain the effective magnetic flux of the permanent magnets 33 within a predetermined range including a maximum value Wm while suppressing the distortion of the induced voltage waveform as much as possible below a predetermined allowable level.

(Deceleration Unit)

Returning to FIG. 1 and FIG. 2, the deceleration unit 3 includes the gear case 40 to which the motor case 5 is attached, and a worm reduction mechanism 41 housed in the gear case 40.

The gear case 40 is made of, for example, a material such as aluminum die casting having excellent heat dissipation. The outer shape of the gear case 40 is formed in, for example, a box shape. The gear case 40 has a gear accommodation portion 42 having the worm reduction mechanism 41 accommodated therein. In addition, an opening portion 43 that allows the through hole 10a of the first motor case 6 to communicate with the gear accommodation portion 42 is formed at a place where the first motor case 6 is integrally formed at an end portion 40a of the gear case 40.

In addition, a guide plate 49 is arranged on the gear case 40. The guide plate 49 is arranged to support an output shaft 48 of the worm reduction mechanism 41 to be rotatable.

The worm reduction mechanism 41 accommodated in the gear accommodation portion 42 is constituted of the worm shaft 44 and a worm wheel 45 meshed with the worm shaft 44.

The worm shaft 44 is arranged coaxially with the shaft 31 of the motor unit 2. Besides, the worm shaft 44 is rotatably supported by bearings 46 and 47 having both ends arranged on the gear case 40. The end portion of the worm shaft 44 on the motor unit 2 side protrudes to the opening portion 43 of the gear case 40 via the bearing 46. The protruding end portion of the worm shaft 44 is joined to the end portion of the shaft 31 of the motor unit 2, and the worm shaft 44 is integrated with the shaft 31. Moreover, the worm shaft 44 and the shaft 31 may be integrally formed by forming a worm shaft portion and a rotary shaft portion from one base material.

The worm wheel 45 meshed with the worm shaft 44 is provided with the output shaft 48 in the radial center of the worm wheel 45. The output shaft 48 is arranged coaxially with the rotary shaft direction of the worm wheel 45, and is connected to a gear unit 50 protruding to the outside of the gear case 40 via the guide plate 49 of the gear case 40. The gear unit 50 is connected to an electrical component (not shown).

In addition, the worm shaft 44 is provided with a rotation position detection portion 60 for detecting the rotation position of the worm shaft 44. The rotation position detection portion 60 is connected to the controller unit 4.

(Controller Unit)

The controller unit 4 that controls the drive of the motor unit 2 has a controller board 62 on which a magnetic detection element or the like is mounted. Besides, the controller board 62 is arranged in the through hole 10*a* of the first motor case 6.

The controller board 62 is a so-called epoxy board in which a plurality of conductive patterns (not shown) are formed. The terminal portion of the coil 24 drawn from the stator core 20 of the motor unit 2 is connected to the controller board 62, and a terminal 11 arranged in the gear case 40 is electrically connected to the controller board 62. In addition, in addition to the magnetic detection element, a power module (not shown) including a switching element such as a field effect transistor (FET) that controls the current supplied to the coil 24 is also mounted on the controller board 62. Furthermore, a capacitor (not shown) for smoothing the voltage applied to the controller board 62 or the like is mounted on the controller board 62.

The terminal 11 is formed in a manner that the terminal 11 can be fitted with a connector extending from an external power supply (not shown). Besides, the controller board 62 is electrically connected to the terminal 11. Accordingly, the electric power of the external power supply is supplied to the controller board 62.

(Operation of Brushless Motor)

Next, the operation of the brushless motor 1 is described.

In the brushless motor 1, the electric power supplied to the controller board 62 via the terminal 11 is selectively supplied to each coil 24 of the motor unit 2 via the power module (not shown).

Then, the current flowing through each coil 24 forms a predetermined interlinkage magnetic flux in the stator 8 (the teeth 22). A magnetic attractive force or repulsive force (magnet torque) is generated between the interlinkage magnetic flux and the effective magnetic flux formed by the permanent magnets 33 of the rotor 9.

Besides, the protrusion direction of the protrusion 35 of the rotor core 32 is set as a direction in which the interlinkage magnetic flux from the stator 8 (the teeth 22) flows easily, and the protrusion 35 generates a reluctance torque that rotates the rotor core 32 so as to reduce the magnetic resistance (reluctance) of the magnetic path of the interlinkage magnetic flux.

The magnet torque and reluctance torque continuously rotate the rotor 9.

The rotation of the rotor 9 is transmitted to the worm shaft 44 integrated with the shaft 31 and further transmitted to the worm wheel 45 meshed with the worm shaft 44. Then, the rotation of the worm wheel 45 is transmitted to the output shaft 48 connected to the worm wheel 45, and the output shaft 48 drives a desired electrical component.

In addition, the detection signal of the rotation position of the worm wheel 45 detected by the magnetic detection element mounted on the controller board 62 and the rotation position detection portion 60 is output to an external device (not shown). The external device (not shown) is, for example, a software function unit that functions by executing a predetermined program by a processor such as a central processing unit (CPU). The software function unit is an electronic control unit (ECU) equipped with a processor such as a CPU, a read only memory (ROM) for storing programs, a random access memory (RAM) for temporarily storing data, an electronic circuit such as a timer, and the like. In addition, at least a part of the external device (not shown) may be an integrated circuit such as a large scale integration (LSI). The external device (not shown) controls the switching timing of the switching element or the like of the power module (not shown) based on the detection signal of the rotation position of the worm wheel 45 and controls the drive of the motor unit 2. Moreover, the output of the drive signal of the power module and the drive control of the motor unit 2 may be executed by the controller unit 4 instead of the external device (not shown).

As described above, according to the rotor 9 of the present embodiment, the protrusion 35 of the rotor core 32 can support more than half of the region on the circumferential side faces 33*d* of the permanent magnets 33 in the protrusion direction. Accordingly, desired fixing stability (for example, seating property or the like) of the permanent magnets 33 on the outer peripheral surface 32*b* of the rotor core 32 can be ensured.

For example, the desired fixing stability of the permanent magnets 33 can be ensured by the protrusion 35 even when the radial thickness of the permanent magnets 33 is formed to be relatively larger than the radial thickness of the rotor core 32.

In addition, the protrusion 35 is formed so as not to protrude closer to the outside than the crossing ridge portion 33*h* where the circumferential side face 33*d* and the connection surface 33*e* of the permanent magnets 33 cross in the protrusion direction. Accordingly, the magnetic flux leaking from the permanent magnet 33 to the protrusion 35 and the distortion of the induced voltage waveform can be suppressed as much as possible below a predetermined allowable level, and the effective magnetic flux of the permanent magnets 33 can be maintained within a predetermined range including a maximum value.

Besides, the orientation of the permanent magnets 33 is a parallel orientation, and the easy magnetization direction in the vicinity of the end portions 33*s* on both sides in the circumferential direction of the permanent magnets 33 adjacent to the protrusion 35 intersects with the protrusion direction of the protrusion 35. Accordingly, formation of a magnetic path by the magnetic flux leaking from the permanent magnet 33 to the protrusion 35 is suppressed, and thus an increase in the leakage flux can be suppressed.

Figure 8:
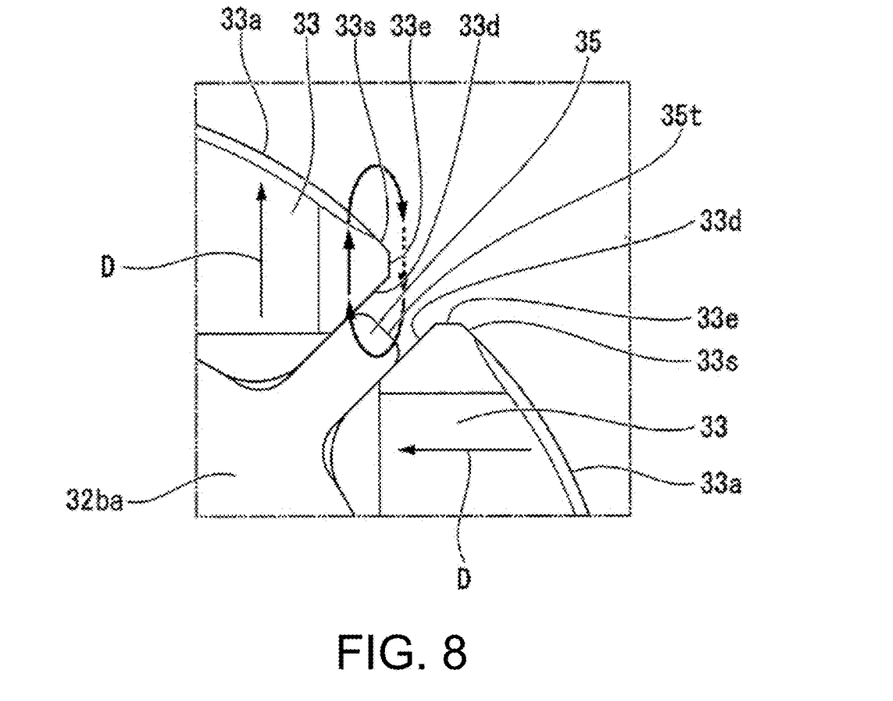
FIG. 8 is a plan view showing an example of the flow of magnetic flux to the protrusion of the rotor according to an embodiment of the present invention.
Figure 9:
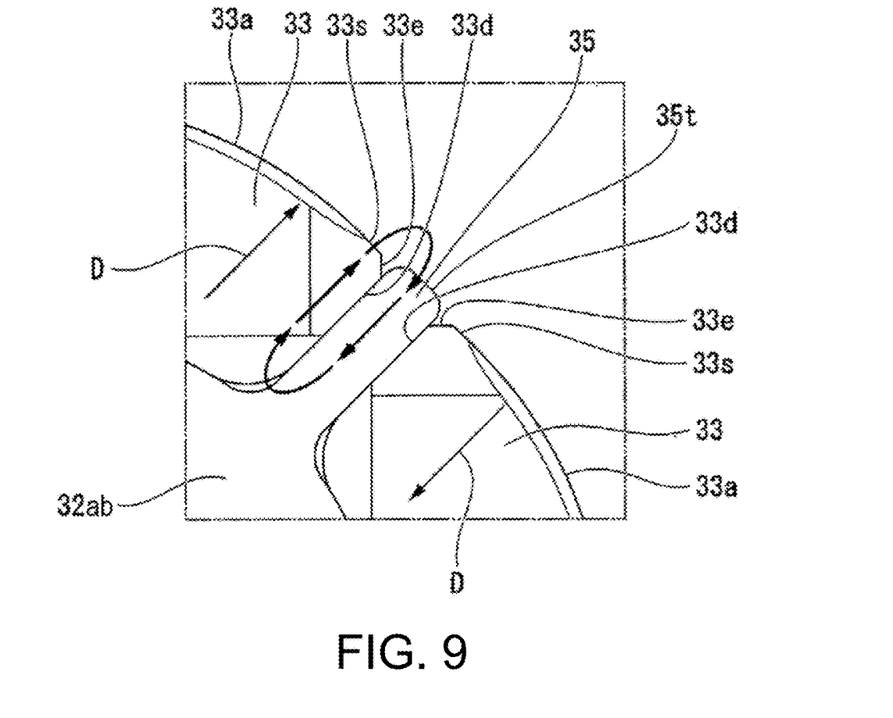
FIG. 9 is a plan view showing an example of the flow of magnetic flux to the protrusion of the rotor in a comparative example of an embodiment of the present invention.

FIG. 8 is a plan view showing an example of the flow of magnetic flux to the protrusion 35 of the rotor 9 in the embodiment. FIG. 9 is a plan view showing an example of the flow of magnetic flux to the protrusion 35 of the rotor 9 in a comparative example of the embodiment.

In the comparative example shown in FIG. 9, the orientation of the permanent magnets 33 is a radial orientation in which an easy magnetization direction D is radial along the radial direction of the permanent magnets 33. In addition, the position of the front end 35*t* of the protrusion 35 in the protrusion direction is arranged closer to the outside than the crossing ridge portion 33*h* of the permanent magnets 33. Accordingly, a magnetic path generated by the magnetic flux leaking from the permanent magnet 33 to the protrusion 35 is easily formed between the end portions 33*s* of the permanent magnets 33 on both sides in the circumferential direction and the protrusion 35.

On the other hand, in the embodiment shown in FIG. 8, the orientation of the permanent magnets 33 is a parallel orientation. In addition, the position of the front end 35*t* of the protrusion 35 in the protrusion direction is arranged within the area between the center 33*g* of the circumferential side face 33*d* of the permanent magnet 33 and the crossing ridge portion 33*h*. Accordingly, the formation of the magnetic path by the magnetic flux leaking from the permanent magnet 33 to the protrusion 35 is suppressed as compared with the comparative example.

Besides, the connection surface 33*e* of the permanent magnet 33 is parallel to the easy magnetization direction of the permanent magnet 33 which is a parallel orientation. Accordingly, the distortion of the induced voltage waveform can be suppressed.

In addition, the brushless motor 1 of the present embodiment includes the rotor 9 that ensures the desired effective magnetic flux of the permanent magnets 33 and suppresses the magnetic flux leaking from the permanent magnet 33 to the protrusion 35 and the distortion of the induced voltage waveform. Accordingly, it is possible to ensure a desired output while suppressing an increase in cogging torque and torque ripple due to the magnetic field distortion and an increase in vibration and noise when the brushless motor 1 is driven.

Variation Example

Hereinafter, a variation example of the embodiment is described.

In the embodiment described above, the arc center Co of the outer peripheral surface 33*a* of the permanent magnets 33 on the radial outer side is eccentric with respect to the shaft center C1 of the shaft 31, but the present invention is not limited thereto. Similar to the arc center Ci of the inner peripheral surface 33*b* on the radial inner side, the arc center Co of the outer peripheral surface 33*a* of the permanent magnets 33 may coincide with the position of the shaft center C1 of the shaft 31.

Moreover, in the embodiment described above, the brushless motor 1 is a drive source for a sunroof mounted on a vehicle, but the present invention is not limited thereto. For example, the brushless motor 1 may be a drive source for various electrical components (for example, a power window, an electric seat, a wiper, and the like) mounted on a vehicle or a drive source mounted on various devices other than the vehicle.

The embodiments of the present invention are illustrative and are not intended to limit the scope of the invention. The embodiments can be implemented in various other forms, and various omissions, replacements, and changes can be made without departing from the gist of the invention. These embodiments and variations thereof are included in the scope and gist of the invention as well as in the scope equivalent to that of the invention set forth in the claims.

What is claimed is:

1. A rotor, comprising: a shaft rotating around a rotary axis;
   a rotor core comprising a base fixed to the shaft and a plurality of protrusions protruding radially outward from the base and arranged at equal intervals in a circumferential direction; and
   a plurality of magnets arranged in the circumferential direction between each two of the plurality of protrusions which are adjacent each other and the base,
   wherein two opposite surfaces of each of the plurality of protrusions in the circumferential direction parallel to each other,
   wherein an orientation of each of the plurality of magnets is a parallel orientation in which an easy magnetization direction is parallel to a radial direction of a center of the plurality of magnets,
   each of the plurality of magnets comprise:
   a magnet outer peripheral surface, and a magnet inner peripheral surface in contact with an outer peripheral surface of the rotor core and is arc-shaped viewed from the rotary axis;
   two circumferential side faces each of which has a flat surface that contacts one of the two opposite surfaces of the protrusion adjacent to the magnet in the circumferential direction; and
   two connection surfaces each of which is connected to one of the two circumferential side faces and to the magnet outer peripheral surface on a radial outer side, and formed so as to gradually approach the center of the magnet in the circumferential direction as directed outward in a protrusion direction of the protrusion, wherein the two connection surfaces are parallel to the easy magnetization direction of the magnet,
   wherein the two flat surfaces of the two circumferential side faces of each two magnets which are adjacent in a circumferential direction are parallel to each other,
   the rotor core having the base and the plurality of the protrusions are configured to extend over an entirety of the rotor core from one end to the other end of the rotor core in an axial direction;
   a position of a front end of each of the plurality of protrusions in the protrusion direction is arranged within an area between a center of each of the two circumferential side faces in the protrusion direction and a crossing ridge portion where the circumferential side face and the connection surface cross.

2. The rotor according to claim 1,
   wherein a radial thickness of the magnets is formed to be larger than a radial thickness of the rotor core.

3. A motor, comprising:
   a stator comprising an annular stator core and a plurality of teeth protruding radially inward from an inner peripheral surface of the stator core;
   a plurality of coils attached to the teeth; and
   the rotor according to claim 2, which is arranged on a radial inner side with respect to the plurality of teeth.

4. A brushless motor, comprising the motor according to claim 3.

5. A motor, comprising:
   a stator comprising an annular stator core and a plurality of teeth protruding radially inward from an inner peripheral surface of the stator core;
   a plurality of coils attached to the teeth; and
   the rotor according to claim 1, which is arranged on a radial inner side with respect to the plurality of teeth.

6. A brushless motor, comprising
the motor according to claim 5.

7. The rotor according to claim 1,
wherein the position of the front end of each of the protrusions is between a first line and a second line,
the first line is connected between the center of the two circumferential side faces of two magnets that adjacent to each other, and
the second line is connected between the two crossing ridge portion of two magnets that adjacent to each other.

8. The rotor according to claim 7,
wherein a radius of a circle centered on the rotary axis and tangent to the position of the front end of each of the protrusions is equal to or greater than a first radius of a circle centered on the rotary axis and tangent to the first line, and is equal to or smaller than a second radius of a circle centered on the rotary axis and tangent to the second line.

* * * * *